(12) United States Patent
Hong et al.

(10) Patent No.: US 10,403,981 B2
(45) Date of Patent: Sep. 3, 2019

(54) ELECTROMAGNETIC WAVE ABSORBER

(71) Applicants: Hyundai Motor Company, Seoul (KR); Kia Motors Corporation, Seoul (KR); Industry-University Cooperation Foundation Hanyang University, Seoul (KR)

(72) Inventors: Wang Gi Hong, Gyeonggi-do (KR); Jae Hoon Choi, Seoul (KR); Eun Jeong, Gyeonggi-do (KR); Jin Pil Tak, Gyeonggi-do (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 395 days.

(21) Appl. No.: 15/335,222

(22) Filed: Oct. 26, 2016

(65) Prior Publication Data
US 2018/0006381 A1    Jan. 4, 2018

(30) Foreign Application Priority Data
Jul. 1, 2016    (KR) .......................... 10-2016-0083649

(51) Int. Cl.
*H01Q 17/00*    (2006.01)
*B32B 5/02*    (2006.01)
(Continued)

(52) U.S. Cl.
CPC ............ *H01Q 17/008* (2013.01); *B32B 3/30* (2013.01); *B32B 5/024* (2013.01); *B32B 15/14* (2013.01);
(Continued)

(58) Field of Classification Search
CPC ........ H01Q 17/008; B32B 3/30; B32B 15/20; B32B 15/14; B32B 5/024;
(Continued)

(56) References Cited

U.S. PATENT DOCUMENTS 3,121,230 A * 2/1964 Brueckmann ........ H01Q 9/0421
174/357
4,132,995 A * 1/1979 Monser .................. H01Q 13/18
343/767
(Continued)

FOREIGN PATENT DOCUMENTS

JP    2003-243876 A    8/2003
JP    2007-073662 A    3/2007
(Continued)

OTHER PUBLICATIONS

Arc Technologies, Inc., web page Salisbury Screen, http://arc-tech.com/salisbury-screen, version dated May 5, 2015 (Year: 2015).*
(Continued)

*Primary Examiner* — Frank J McGue
(74) *Attorney, Agent, or Firm* — Mintz Levin Cohn Ferris Glovsky and Popeo, P.C.; Peter F. Corless

(57) ABSTRACT

An electromagnetic wave absorber that improves an electromagnetic wave absorption rate in a specific frequency is provided. The electromagnetic wave absorber includes a dielectric layer; a first metal conductive layer disposed on a first surface of the dielectric layer and having a slot positioned symmetrical about a center of the dielectric layer and a second metal conductive layer disposed on a second surface of the dielectric layer.

7 Claims, 18 Drawing Sheets

(51) Int. Cl.
  *B32B 15/14* (2006.01)
  *B32B 15/20* (2006.01)
  *B32B 3/30* (2006.01)

(52) U.S. Cl.
  CPC .......... *B32B 15/20* (2013.01); *B32B 2250/03* (2013.01); *B32B 2250/40* (2013.01); *B32B 2260/021* (2013.01); *B32B 2260/046* (2013.01); *B32B 2262/101* (2013.01); *B32B 2307/202* (2013.01); *B32B 2307/204* (2013.01); *B32B 2307/212* (2013.01); *B32B 2457/00* (2013.01); *B32B 2605/00* (2013.01)

(58) Field of Classification Search
  CPC ........ B32B 2307/212; B32B 2307/202; B32B 2605/00; B32B 2307/204; B32B 2457/00; B32B 2250/03; B32B 2250/40; B32B 2260/046; B32B 2260/021; B32B 2262/101
  USPC .............................................................. 342/1
  See application file for complete search history.

(56) References Cited

U.S. PATENT DOCUMENTS

| | | | | |
|---|---|---|---|---|
| 6,538,596 | B1* | 3/2003 | Gilbert | F41H 3/00 342/1 |
| 6,600,447 | B1* | 7/2003 | Molnar | H04B 7/086 342/373 |
| 2005/0151597 | A1* | 7/2005 | Brunker | H01P 3/02 333/5 |
| 2010/0156695 | A1* | 6/2010 | Sim | H01Q 17/008 342/1 |
| 2011/0149538 | A1 | 6/2011 | Cui et al. | |
| 2011/0241943 | A1* | 10/2011 | Shiu | B23K 1/0016 343/700 MS |
| 2013/0277579 | A1* | 10/2013 | Sim | H05K 9/0003 250/515.1 |

FOREIGN PATENT DOCUMENTS

| | | |
|---|---|---|
| KR | 10-1521211 B1 | 5/2015 |
| KR | 10-1532359 B1 | 6/2015 |
| KR | 10-1627939 31 | 6/2016 |

OTHER PUBLICATIONS

Tang, Jingyao, et al, "Cross polarization conversion based on a new chiral spiral slot structure in THz region", Opt Quant Electron (2016) 48:111, 11 pages.

E. Jeong et al., "A Metamaterial Absorber for Reducing False Image in 24 GHz Automotive Radar System," Nov. 12, 2015, ISAP2015.

J. Tak, et al., "Design of a Metamaterial Asorber for 24 GHz Automotive Radar System," Asian Workshop on Antennas and Propagation, Centum Hotel, Busan, Korea, Jan. 27-29, 2016.

* cited by examiner

ELECTROMAGNETIC WAVE ABSORBER

CROSS-REFERENCE TO RELATED APPLICATION

This application is based on and claims the benefit of priority to Korean Patent Application No. 10-2016-0083649, filed on Jul. 1, 2016 in the Korean Intellectual Property Office, the disclosure of which is incorporated herein in its entirety by reference.

BACKGROUND

Technical Field

The present disclosure relates to an electromagnetic wave absorber, and more particularly, to an electromagnetic wave absorber that improves an electromagnetic wave absorption rate in a specific frequency.

Description of the Related Art

Recently, vehicles have been equipped with various electronic control systems for security and convenience. For example, vehicle environments have been increasingly complicated and a radar sensor for a vehicle has been as a core sensor of intelligent vehicles. In an intelligent vehicle a radar is used to sense a distance to an adjacent vehicle, a speed and an angle of the adjacent vehicle to warn a user or control the vehicle. When a vehicle is sensed using a radar sensor, a to-be-sensed vehicle, which is not present in actuality may be detected due to multi-reflection or scattered reflection of electromagnetic waves from an internal structure of a vehicle bumper or an external structure of a vehicle bumper such as a wheel, or the like. Accordingly, a radar false image may be formed. The radar false image may cause an erroneous sensing and erroneous operation of the radar sensor. Since this issue is directly related to user safety an electromagnetic wave absorber that absorbs electromagnetic waves incident in various directions is required to reduce the false image.

Further, electromagnetic wave absorbers have been extensively used in stealth techniques and electromagnetic darkrooms, or to solve various electromagnetic interferences (EMI) and require different characteristics based on usage fields. A material used for an electromagnetic wave absorber includes a conductive loss material, a dielectric loss material and a magnetic loss material. The conductive loss material is formed to have a pyramid or a mountain geometry to maximize absorption performance of electromagnetic waves based on an induced current. For example, during the magnetic loss material or the dielectric loss material when an electric field or a magnetic field is applied thereto, electric dipoles or magnetic dipoles are aligned and electromagnetic wave energy may be consumed as thermal energy. Generally, an absorber using a conductive loss material is voluminous and an absorber using a dielectric loss material is not suitable for use in a high frequency. Accordingly, a magnetic loss material is extensively used as a material of an absorber. However, natural ferrite or a composite ferrite obtained by synthesizing natural ferrite is high in price due to scarcity of a material. An absorber is configured by mixing the three types of material described above to satisfy various absorption conditions. An electromagnetic wave absorber may be classified as an attenuation type absorber that uses a conductive loss material, a loss type absorber that uses a magnetic loss material or a dielectric loss material, and a resonance type absorber resonated in a specific frequency on a dielectric layer based on schemes of absorbing electromagnetic waves.

Recently, research into electromagnetic wave absorbers has been conducted in various fields. Traditionally, research into electromagnetic wave absorbers has been conducted by synthesizing a new material to be used as an absorbing member, adjusting a composition ratio of materials used in an absorbing member and a support member or adjusting a geometrical structure of an absorber. The attenuation type absorber or the material loss type absorber corresponds thereto. These absorbers exhibit high absorption capability over a broad band using inherent properties of materials. However, the attenuation type absorber using a conductive loss material is voluminous and easily damaged. Accordingly, the attenuation type absorber is not used in a portable device or in an outdoor area. Thus, these absorbers are used in indoor applications such as an electromagnetic darkroom or the like and in fields in which a volume is irrelevant. The absorber using a dielectric loss material has improved absorption capability as permittivity is increased, but cost is increased and the permittivity of the material is reduced in a high frequency. The a magnetic loss material used in a loss type absorber is high in price due to rarity of ferrite. In contrast, a resonance type absorber is particularly manufactured to be used in a target specific field.

Recently, absorbers having high absorption performance in a specific band using meta-materials have been actively researched. For example, the absorbers generally have a narrowband centered on a frequency in which resonance occurs and are not used in various fields, but exhibit sufficient absorption performance in a target band. Additionally, compared with the broadband absorbers, the absorbers using meta-materials have a reduced cost and a reduced volume and satisfy various characteristics based on designs potentially anticipating demand therefor in various fields. Currently, absorbers of MICS [Medical Implant Communication Service] and ISM [Industrial, Scientific and Medical] bands used in wireless power transmission, medical equipment, wireless body area network (WBAN) and the like have mainly been studied.

Furthermore, limited research into development of an electromagnetic wave absorber for preventing a false image in fields in which a specific frequency is used such as a vehicle radar, or the like has been conducted. Currently, broadband absorbers using a magnetic material are used as an electromagnetic wave absorber. However, the use of the broadband absorbers may involve the aforementioned problems.

The above information disclosed in this section is intended merely to aid in the understanding of the background of the invention and therefore it may contain information that does not form the prior art that is already known in this country to a person of ordinary skill in the art.

SUMMARY

The present disclosure provides an electromagnetic wave absorber that increases an electromagnetic wave absorption rate with respect to a target frequency in a specific narrowband using meta-materials.

According to an exemplary embodiment of the present disclosure, an electromagnetic wave absorber may include a dielectric layer, a first metal conductive layer disposed on a first surface of the dielectric layer and having a slot symmetrical about a center of the dielectric layer and a second metal conductive layer disposed on a second surface of the dielectric layer.

The slot may include a split ring resonator (SRR) pattern having a centro-symmetry and a loop-on edge geometry. The slot of the first metal conductive layer may include a pinwheel structure that connect a plurality of the slots relative to a center of the first metal conductive layer. A plurality of the slots may be disposed from the center of the first metal conductive layer. In some exemplary embodiments, each of the plurality of the slots may include a first slot portion that extends from a center of a second metal conductive layer, a second slot portion that crosses the first slot portion at a predetermined angle, a third slot portion that crosses the second slot portion at a predetermined angle and a fourth slot portion that crosses the third slot portion at a predetermined angle.

The first slot portion and the second slot portion may be couple to cross each other at about 90°. The second slot portion and the third slot portion may be coupled to cross each other at about 90°. The third slot portion and the fourth slot portion may be coupled to cross each other at about 90°. The first slot portion, the second slot portion, the third slot portion, and the fourth slot portion may have a substantially similar width w. The plurality of the slots may include a centro-symmetrical pinwheel structure configured to rotate the plurality of slots relative to each other at a predetermined angle in a clockwise or counterclockwise direction. The plurality of the slots may be positioned from the center of the first metal conductive layer. In particular, each slot may be individually disposed on a first, a second, a third, and fourth quadrant surface from the center of the first metal conductive layer. A surface area of the second metal conductive layer may be equal to a surface area of the dielectric layer.

BRIEF DESCRIPTION OF THE DRAWINGS

The above and other objects, features and advantages of the present disclosure will be more apparent from the following detailed description when taken in conjunction with the accompanying drawings.

DETAILED DESCRIPTION

Figure 1:
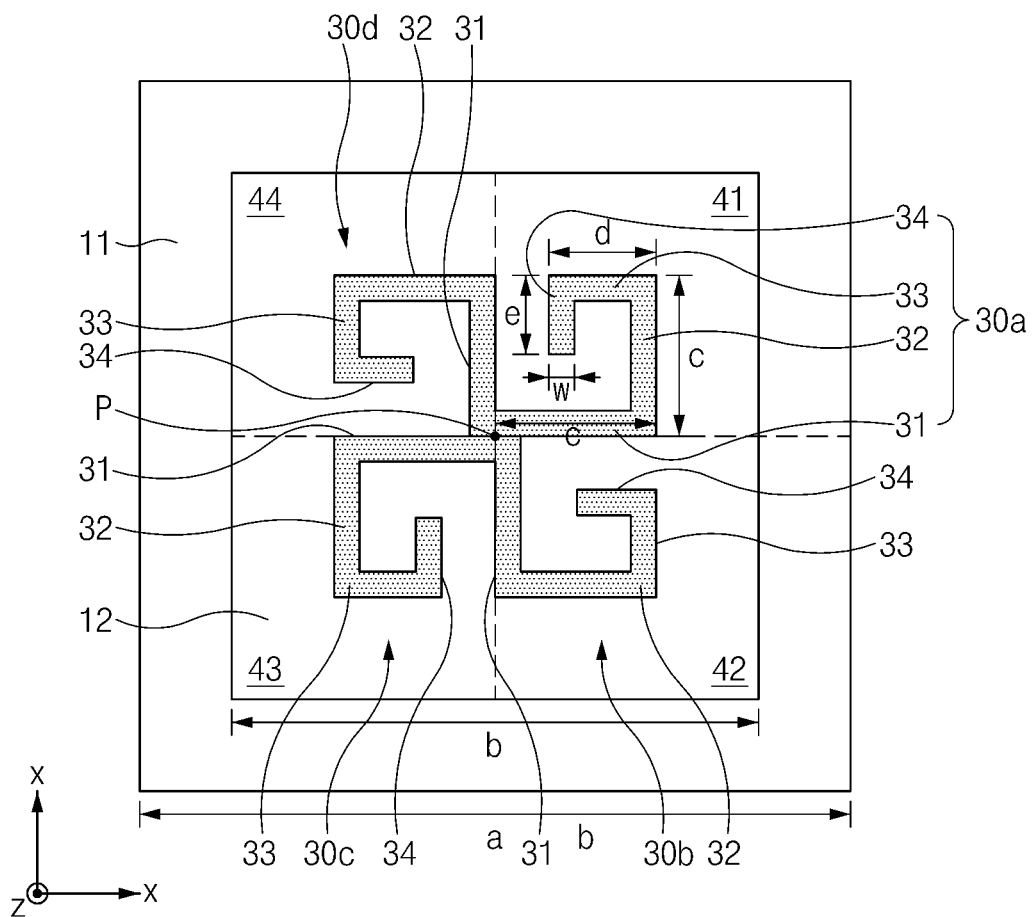
FIG. 1 is an exemplary plan view illustrating a unit cell of an electromagnetic wave absorber according to various exemplary embodiments of the present disclosure.

Hereinafter, exemplary embodiment of the present disclosure will be described in detail with reference to the accompanying drawings. For reference, dimensions of elements or thicknesses of lines illustrated in the drawings referred to describe the present disclosure may be exaggerated for the convenience of understanding. Also, the terms used henceforth have been defined in consideration of the functions of the present disclosure, and may be altered according to the intent of a user or operator, or conventional practice. Therefore, the terms should be defined based on the entire content of this specification.

The terminology used herein is for the purpose of describing particular embodiments only and not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Figure 2:
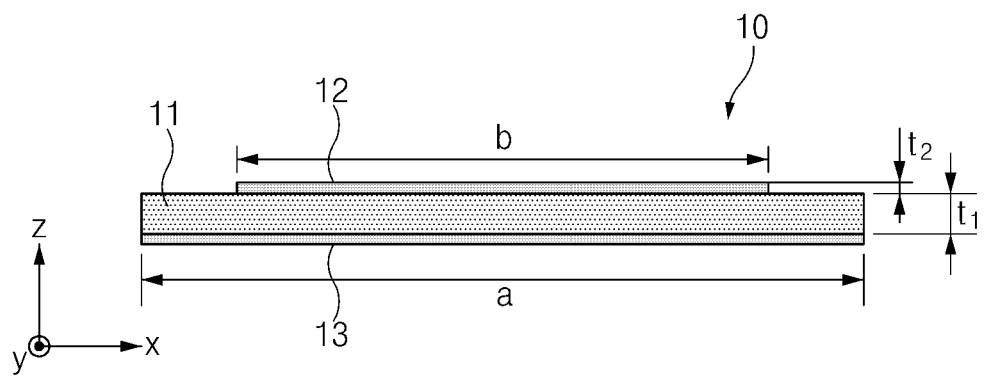
FIG. 2 is an exemplary side view illustrating a unit cell of an electromagnetic wave absorber according to various exemplary embodiments of the present disclosure.

An electromagnetic wave absorber according to various exemplary embodiments may include one or more unit cells 10 having a meta-material structure. The plurality of unit cells 10 may be arranged to include various structures to form the electromagnetic wave absorber. Referring to FIGS. 1 and 2, the unit cell 10 may include a dielectric layer 11, a first metal conductive layer 12 disposed on a first surface of the dielectric layer 11 and a second metal conductive layer 13 disposed on a second surface of the dielectric layer 11.

In particular, since the dielectric layer 11, the first metal conductive layer 12, and the second metal conductive layer 13 of the unit cell 10 may form a metal-material structure, an electromagnetic wave absorption rate within a specific target frequency may be increased. The dielectric layer 11 that corresponds to a medium of a radio frequency (RF) signal may be formed of a material having specific permittivity. According to an exemplary embodiment, the dielectric layer 11 may be formed of a glass epoxy (e.g., FR4) commonly used in a printed circuit board (PCB. Further, application of the general-purpose glass epoxy substrate may facilitate mass-production at a reduced cost. The dielectric layer 11 may smoothly absorb an RF signal when a thickness thereof is increased. However the dielectric layer 11 may be formed to have flexibility when applied to an interior environment of a vehicle.

The first metal conductive layer 12 may be formed of a conductive material (e.g., copper, or the like) and may exhibit properties of the first metal conductive layer (e.g., resonant patch) and may include slots 30a, 30b, 30c, and 30d in predetermined patterns to increase an absorption rate in a predetermined target frequency (e.g., 24 GHz commonly used in a radar of a vehicle, or the like). The slots 30a, 30b, 30c, and 30d of the first metal conductive layer 12 may have a split ring resonator (SRR) pattern. In particular, as illustrated in FIG. 1 the patterns of the slots 30a, 30b, 30c, and 30d may have a centro-symmetry and a loop-on edge geometry (e.g., a pinwheel, or the like). Accordingly, the first metal conductive layer 12 may increase insensitivities to polarization and enhance insensitivities to an incident angle when a path of current is formed to extend from an edge to the center. According to various exemplary embodiments, the plurality of slots 30a, 30b, 30c, and 30d of the resonant path 12 may be connected in relation to the center P of the first metal conductive layer 12, to thereby form a pinwheel structure. Each of the slots 30a, 30b, 30c, and 30d may include a first slot portion 31 that extends from the center P of the first metal conductive layer 12, a second slot portion 32 that may be formed to cross the first slot portion at a predetermined angle, a third slot portion 33 that may be formed to cross the second slot portion 32 at a predetermined angle, and a fourth slot portion 34 that may be formed to cross the third slot portion 33 at a predetermined angle.

According to an exemplary embodiment, the first slot portion 31 and the second slot portion 32 may be coupled to cross each other at about 90°, the second slot portion 32 and the third slot portion 33 may be coupled to cross each other at about 90°, and the third slot portion 33 and the fourth slot portion 34 may be coupled to cross each other at about 90°. The first slot portion 31, the second slot portion 32, the third slot portion 33, and the fourth slot portion 34 may have a substantially equal width w. To implement the pinwheel structure, the plurality of slots 30a, 30b, 30c, and 30d may have a centro-symmetrical structure to rotate the plurality of slots 30a, 30b, 30c, and 30d relative to each other at a predetermined angle in a clockwise or counterclockwise direction. The plurality of slots 30a, 30b, 30c, and 30d may be disposed on a first surface 41, a second surface 42, a third surface 43, and a fourth surface 44, respectively, quadrisected relative to the center P of the first metal conductive layer 12. The first surface 41, the second surface 42, the third surface 43, and the fourth surface 44 may be positioned sequentially from a right upper portion and disposed in a clockwise direction. Accordingly, the plurality of slots 30a, 30b, 30c, and 30d may include the first slot 30a disposed on the first surface 41, the second slot 30b disposed on the second surface 42, the third slot 30c disposed on the third surface 43, and the fourth slot 30d disposed on the fourth surface 44.

As illustrated in FIG. 1, the second slot 30b may have a shape in which the first slot 30a may be rotated about 90° in a clockwise direction, the third slot 30c may have a shape in which the second slot 30b may be rotated about 90° in a clockwise direction, and the fourth slot 30d may have a shape when the third slot 30c may be rotated about 90° in a clockwise direction. The second metal conductive layer 13 may be disposed on a second surface of the dielectric layer 11, (e.g., on the opposite side of the first metal conductive layer 12). The first metal conductive layer 12 and the second metal conductive layer 13 may be positioned to be parallel to each other. The second metal conductive layer 13 may be formed of a conductive material (e.g., copper or the like) to reflect electromagnetic waves incident through the first metal conductive layer 12 to prevent transmission of the electromagnetic waves. For example, the second metal conductive layer 13 may be formed to include a structure with a substantially equal length and substantially equal width (e.g., the same area) as the dielectric layer 11 and the edge of the second metal conductive layer 13 may be aligned with the edge of the dielectric layer 11.

A width a of the dielectric layer 11 and the second metal conductive layer 13, a width b of the patch 12, the width w of the slot portions 31, 32, 33, and 34, a length c of the first slot portion 31, a length of c of the second slot portion 32, a length d of the third slot portion 33, a length e of the fourth slot portion 34, a thickness t2 of the patch 12, and a thickness t1 of the dielectric layer 11 may be designed based on target frequencies and electromagnetic wave absorption rates in various narrowband frequencies may be enhanced. In particular, the lengths of the slots 30a, 30b, 30c, and 30d may affect inductance and capacitance of the unit cell 10 in addition to mutual-inductance and capacitance between the unit cells 10. For example, when the length d of the third slot portion 33 is increased, a current path may be lengthened and a resonant frequency may be adjusted toward a lower frequency. Additionally, when the length e of the fourth slot portion 34 is increased, the resonant frequency may be adjusted toward a lower frequency.

Figure 3:
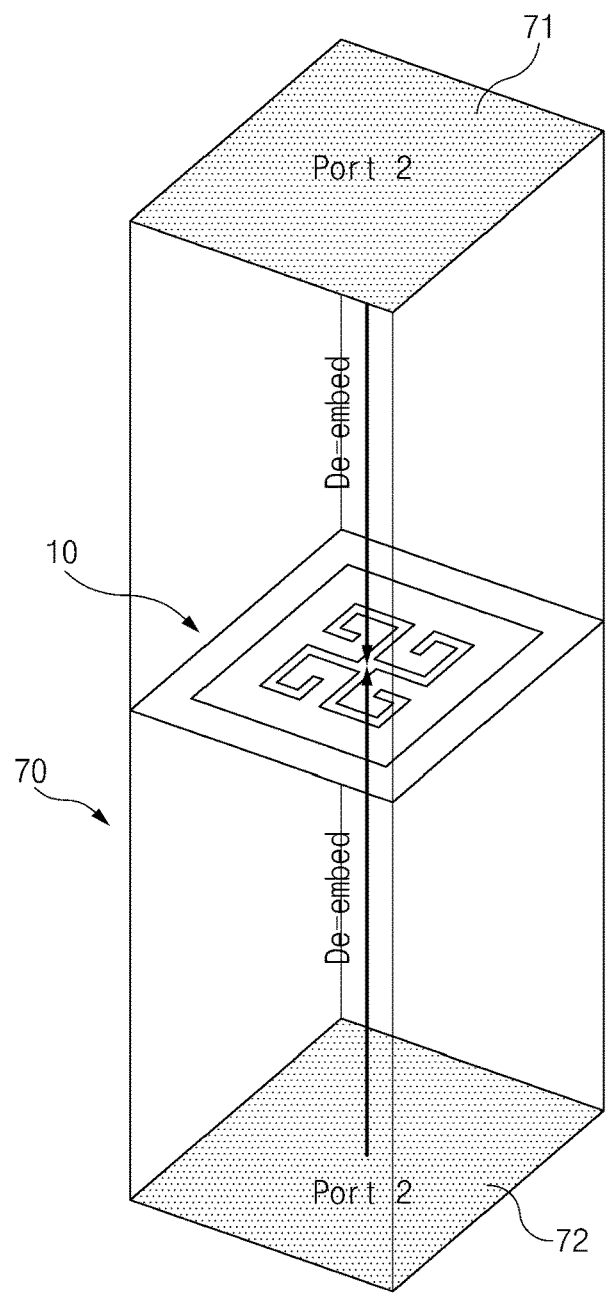
FIG. 3 is an exemplary view illustrating a simulation model for designing a unit cell of an electromagnetic wave absorber according to various exemplary embodiments of the present disclosure.
Figure 4:
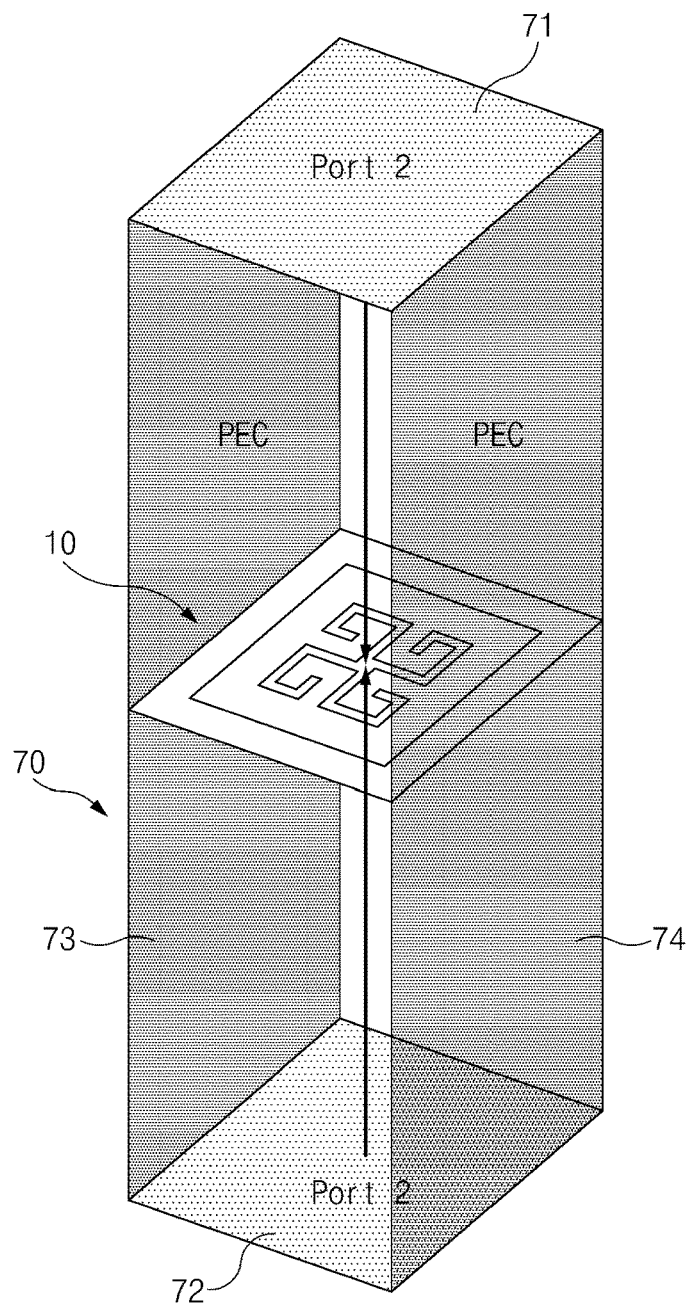
FIG. 4 is an exemplary view illustrating a state in which a left side and a right side of a radiation box of FIG. 3 are set as boundary conditions of a perfect electric conductor (PEC) according to an exemplary embodiment of the present disclosure.
Figure 5:
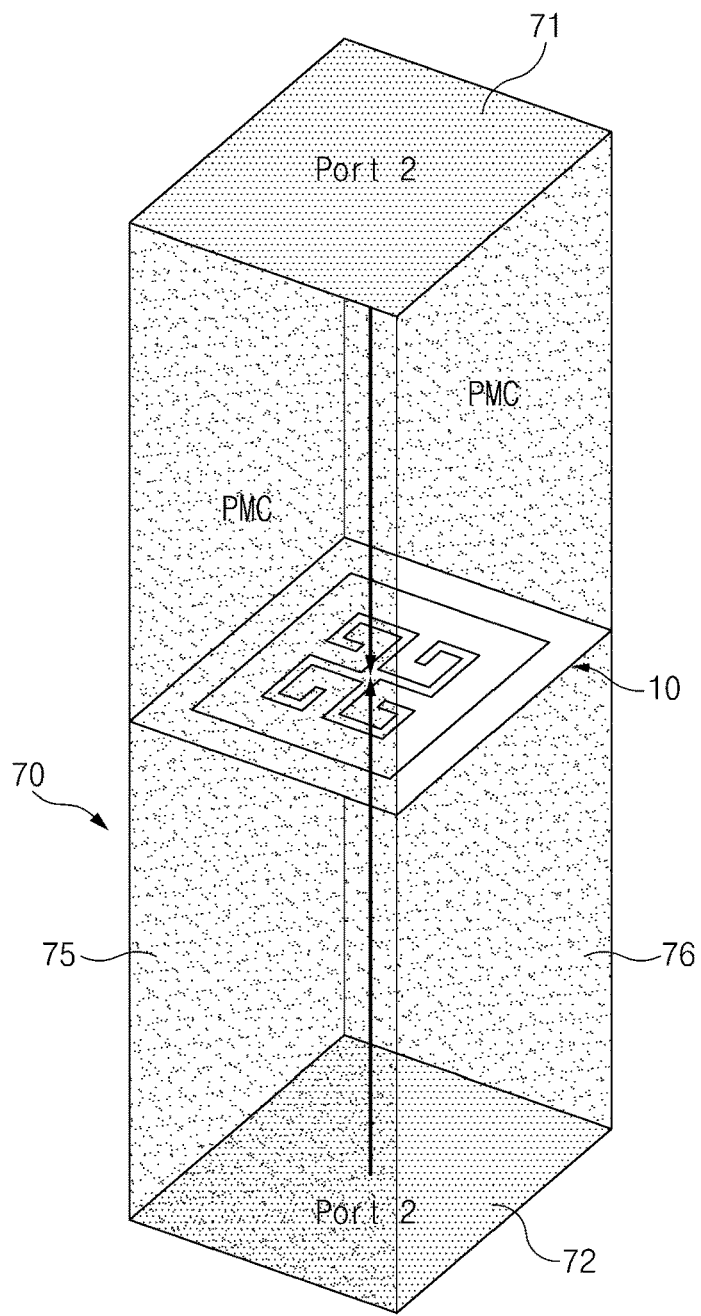
FIG. 5 is an exemplary view illustrating a state in which a front side and a rear side of a radiation box of FIG. 3 are set as boundary conditions of a perfect magnetic conductor (PMC) according to an exemplary embodiment of the present disclosure.

FIGS. 3, 4, and 5 are exemplary views illustrating simulation conditions for designing the unit cell 10 of an electromagnetic wave absorber according to an exemplary embodiment. The unit cell 10 of the present disclosure may be designed in a virtual waveguide. As illustrated in FIG. 3, the unit cell 10 of the present disclosure may be designed by a radiation box 70 to include multiple ports 71 and 72 that use a waveguide. Additionally, as illustrated in FIG. 3, an S-parameter disposed at an interface between a surface of the unit cell 10 and a TEM waveguide may be extracted using a De-embed function. As illustrated in FIG. 4, a left side 73 and a right side 74 of the radiation box 70 may be set as boundary conditions of a perfect electric conductor (PEC). As illustrated in FIG. 5, a front side 75 and a rear side 76 of the radiation box 70 may be set as boundary conditions of a perfect magnetic conductor (PMC).

An absorption rate may be defined as expressed by Equation 1 below.

$$A(\omega)=1-T(\omega)-R(\omega) \quad \text{Equation 1}$$

As shown in Equation 1, to obtain a maximum absorption rate, a reflection coefficient $R(\omega)$ and a transmission coefficient $T(\omega)$ in a required frequency band may be minimized. Additionally, to minimize reflectance as expressed by Equation 2 below, impedance of an absorber may be matched to impedance of a free space.

$$Z(\omega)=\sqrt{\mu(\omega)/\varepsilon(\omega)}=Z_0(\omega)=377\Omega \quad \text{Equation 2}$$

(impedance of free space)

The reflection coefficient and the transmission coefficient may be calculated by a 2-port S-parameter as expressed by Equation 3 and Equation 4 below.

$$R=S_{11}^2 \quad \text{Equation 3}$$

$$T=S_{21}^2 \quad \text{Equation 4}$$

Thus, an absorption rate may be expressed by Equation 5 below.

$$A(\omega)=1-T(\omega)-R(\omega)=1-S_{21}^2-S_{11}^2 \quad \text{Equation 5}$$

Furthermore, in the electromagnetic wave absorber according to an exemplary embodiment of the present disclosure, since the second metal conductive layer 13 may be disposed on a lower surface of the dielectric layer 11, transmission may not occur, and an absorption rate may be expressed by Equation 6 below.

$$A(\omega)=1-R(\omega)=1-S_{11}^2 \quad \text{Equation 6}$$

Exemplary Embodiment 1

The unit cell 10 that corresponds to 24.1 GHz as a frequency of a radar sensor for a vehicle may be designed through the simulation conditions illustrated in FIGS. 3, 4, and 5.

As illustrated in Table 1, the width a of the dielectric layer 11 and the second metal conductive layer 13 may be about 2.6 mm, the width b of the patch 12 may be about 19 mm, the width w of the slot portions 31, 32, 33, and 34 may be about 01 mm, the length c of the first slot portion 31 and the second slot portion 32 may be about 0.6 mm, the length d of the third slot portion 33 may be about 0.4 mm, the length e of the fourth slot portion 34 may be about 0.3 mm, the thickness t2 of the patch 12 may be about 0.2 mm, and the thickness t1 of the dielectric layer 11 may be about 0.017 mm.

TABLE 1

| Design factor | Size (mm) |
| --- | --- |
| a | 2.6 |
| b | 1.9 |
| c | 0.6 |
| d | 0.4 |
| e | 0.3 |
| w | 0.1 |
| t1 | 0.2 |
| t2 | 0.017 |

The dielectric layer 11 may be a glass epoxy substrate (FR4) that has a permittivity ($\varepsilon_r$) of about 4.4 and the first metal conductive layer 12 and the second metal conductive layer 13 may be formed of copper.

Figure 6:
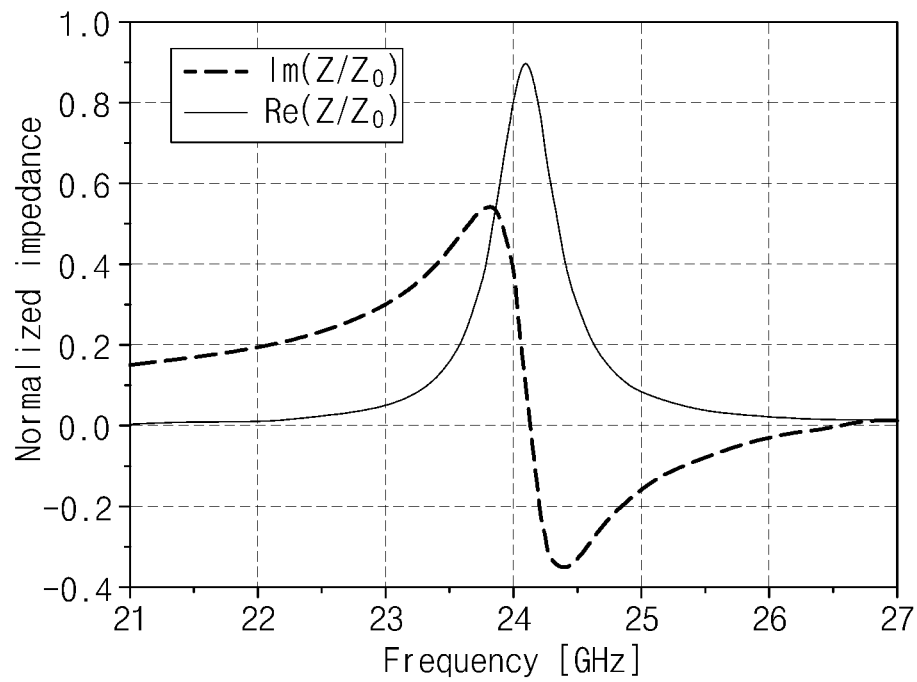
FIG. 6 is an exemplary graph illustrating impedance characteristics regarding a unit cell according to an exemplary embodiment of the present disclosure.
Figure 7:
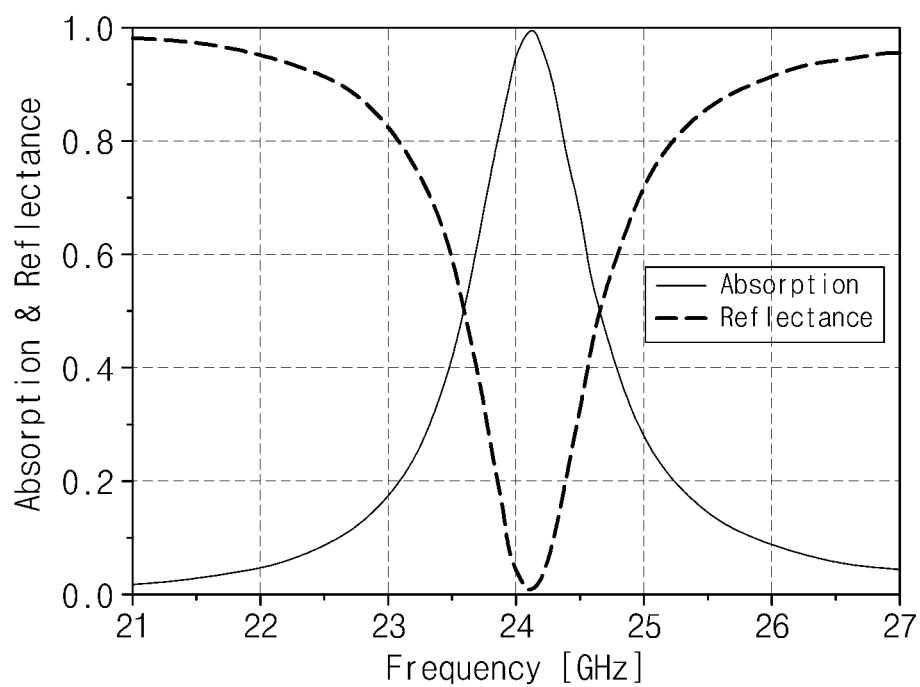
FIG. 7 is an exemplary graph illustrating an absorption rate and reflectance regarding a unit cell according to an exemplary embodiment of the present disclosure.

FIG. 6 illustrates impedance characteristics of the unit cell 10 of Exemplary Embodiment 1 designed according to the aforementioned Table 1 and material specifications. In FIG. 6, an imaginary part of impedance may be 0 in a 24.15 GHz band that has a maximum absorption rate and a real part has impedance of about 377Ω of impedance of a free space, that may match the impedance. FIG. 7 is an exemplary view that illustrates an absorption rate and reflectance of the unit cell 10 of Exemplary Embodiment 1. In particular the unit cell 10 may include an electromagnetic wave absorption rate of about 99% at 24.15 GHz and a full-width at half maximum (FWHM) of about 1.05 GHz.

Figure 8:
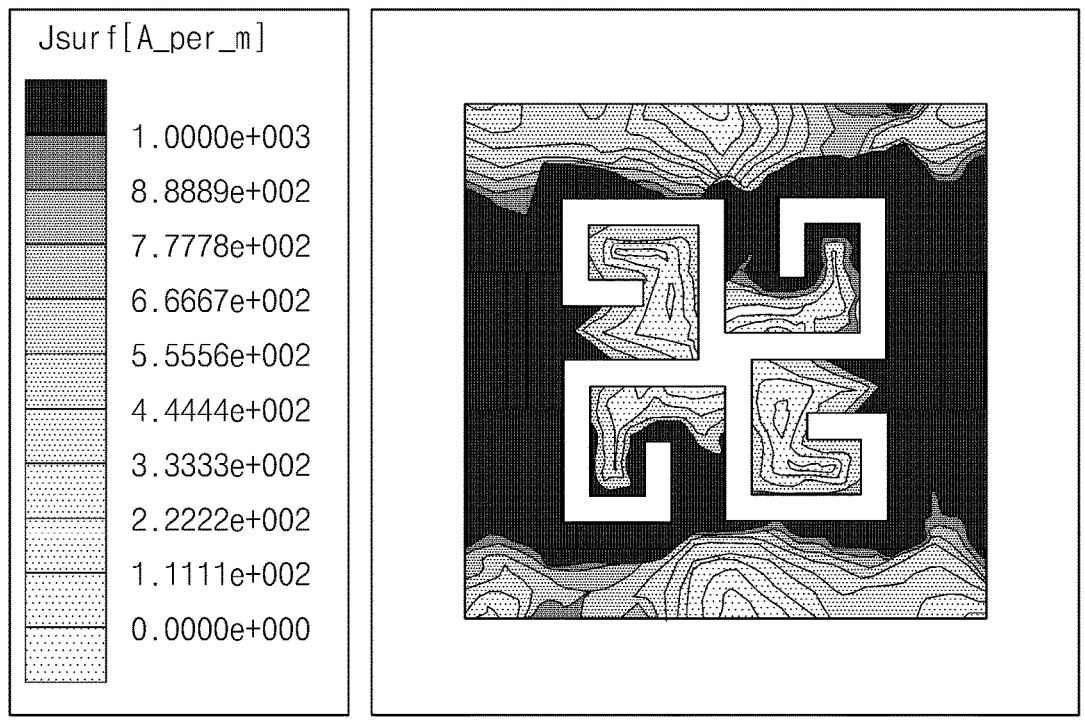
FIG. 8 is an exemplary graph illustrating a current distribution regarding a unit cell according to an exemplary embodiment of the present disclosure.
Figure 9:
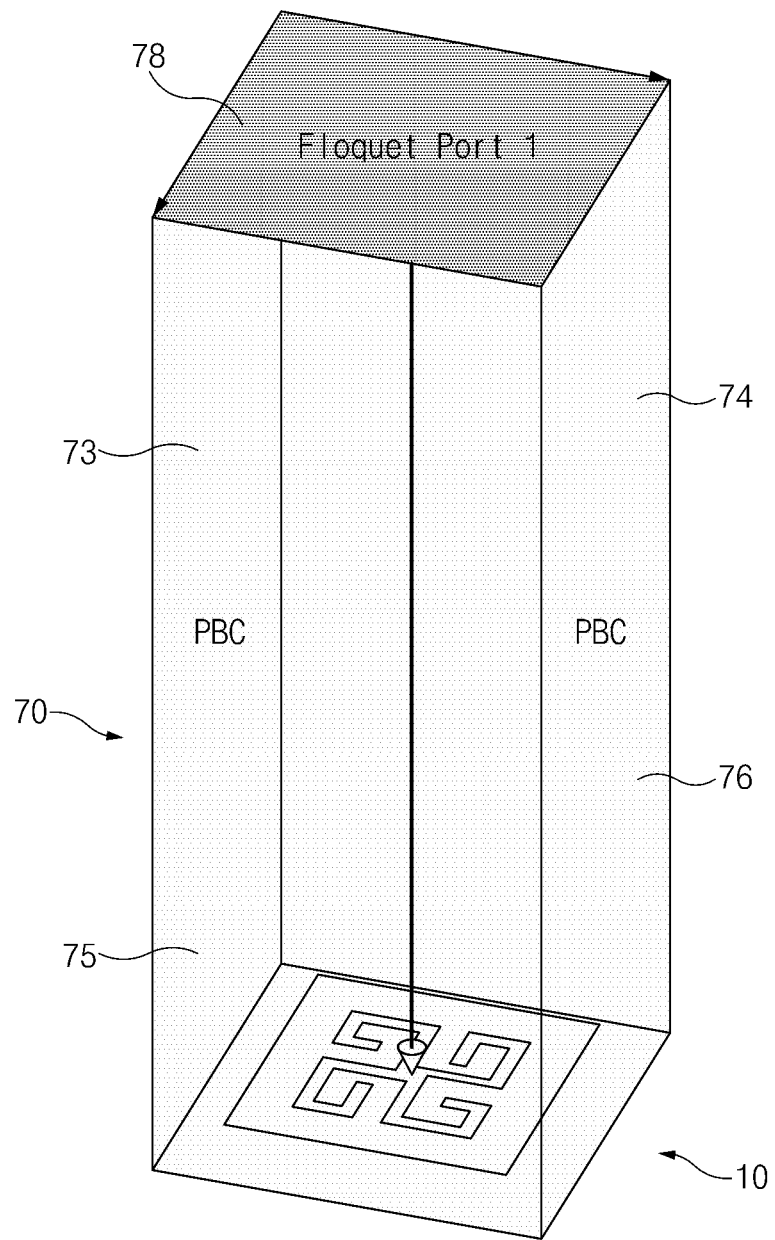
FIG. 9 is an exemplary view illustrating a simulation model in which all the left side, the right side, the front side, and the rear side of a radiation box are set as periodic boundary conditions (PBC) based on master and slave radiation conditions according to an exemplary embodiment of the present disclosure.

FIG. 8 illustrates a current distribution of the unit cell 10 of Exemplary Embodiment 1 at about 24.1 GHz. For example an overall strong current may be induced. FIG. 9 is an exemplary view that illustrates a simulation model when a left side 73, a right side 74, a front side 75, and a rear side 76 of the radiation box 70 may be periodic boundary conditions (PBC) based on master and slave radiation conditions. An S-parameter may be extracted by applying one floquet port 78 (e.g., port for interpreting a period structure) and through the simulation mode an incident angle of the unit cell 10 of Exemplary Embodiment 1 or characteristics regarding polarization may be effectively recognized.

Figure 10:
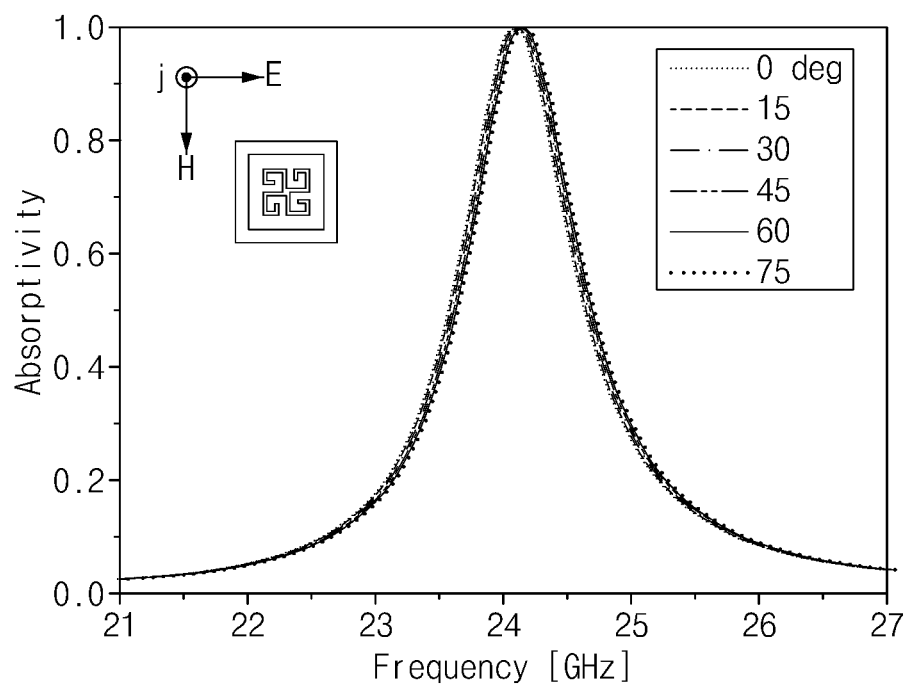
FIG. 10 is an exemplary graph illustrating absorption rates of a unit cell according to an exemplary embodiment of the present disclosure regarding various polarization angles.
Figure 11:
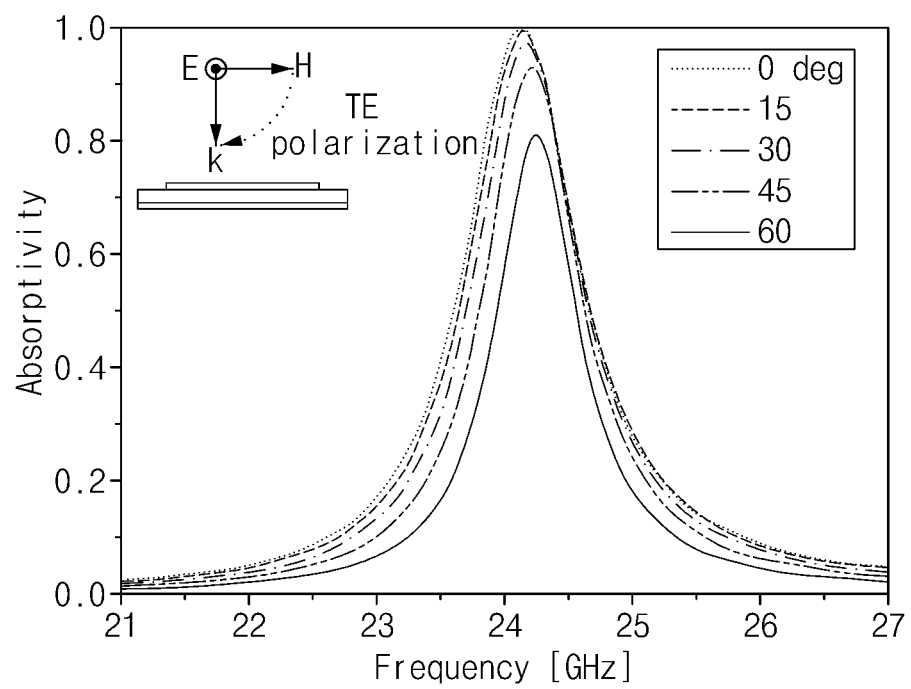
FIG. 11 is an exemplary graph illustrating absorption rates of a unit cell according to an exemplary embodiment of the present disclosure regarding various incident angles in a TE mode.
Figure 12:
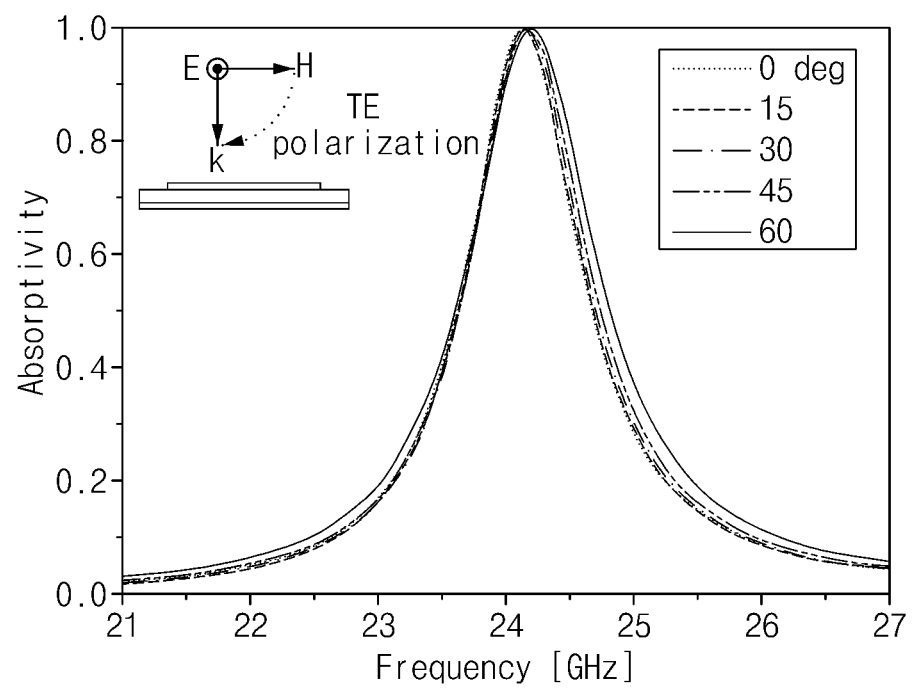
FIG. 12 is an exemplary graph illustrating absorption rates of a unit cell according to an exemplary embodiment of the present disclosure regarding various incident angles in a TM mode.

FIGS. 10, 11, and 12 are exemplary graphs illustrating characteristics of the unit cell 10 of Exemplary Embodiment 1 through the simulation model of FIG. 9. FIG. 10 is an exemplary graph illustrating absorption rates of the unit cell 10 of Exemplary Embodiment 1 regarding various polarization angles, and similar absorption rates may be obtained at different polarization angles. FIG. 11 is an exemplary graph that illustrates absorption rates of the unit cell 10 of Exemplary Embodiment 1 regarding various incident angles in a TE mode [Transvers Electric; no Electric field in the direction of propagation (i.e., Electric field is perpendicular to the direction of propagation)] and similar absorption rates may be obtained at different incident angles. FIG. 12 is an exemplary graph illustrating absorption rates of the unit cell 10 of Exemplary Embodiment 1 regarding various incident angles in a TM mode [Transvers Magnetic; no Magnetic field in the direction of propagation (i.e., Magnetic field is perpendicular to the direction of propagation.)], and similar absorption rates may be obtained at different incident angles. As shown in FIGS. 10, 11, and 12, the unit cell 10 according to the present disclosure may have insensitive characteristics with respect to polarization angles and incident angles and excellent absorption performance at the target frequency of about 24.1 GHz.

Figure 13:
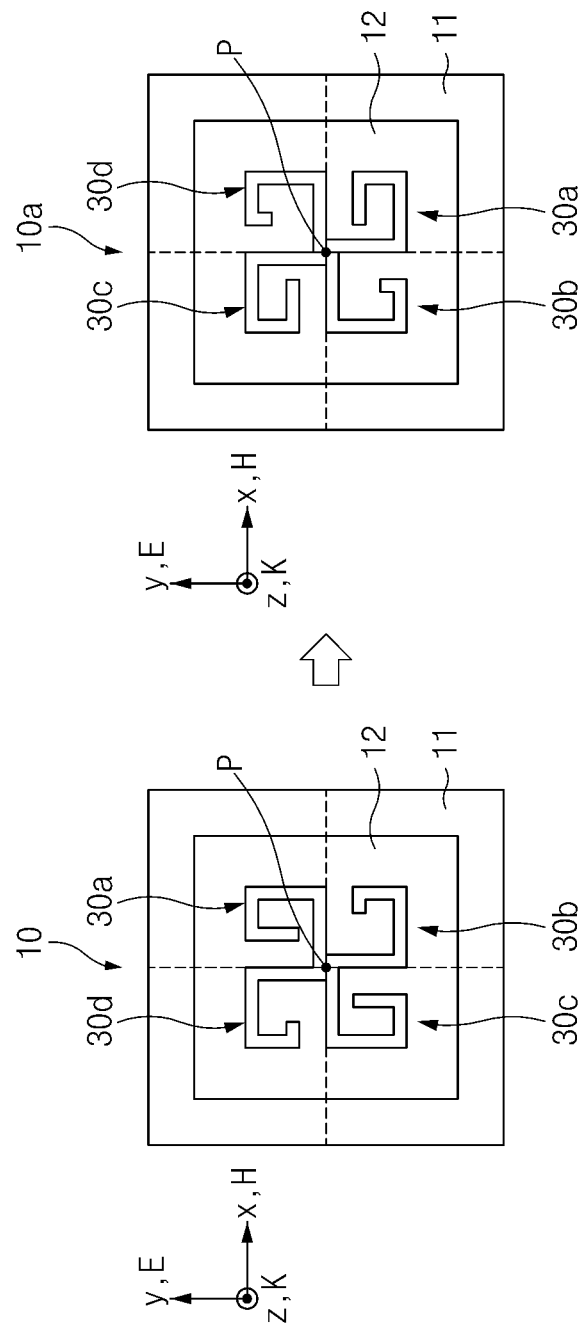
FIG. 13 is an exemplary view illustrating a process of deriving a deformed unit cell from a unit cell according to various exemplary embodiments of the present disclosure.
Figure 14:
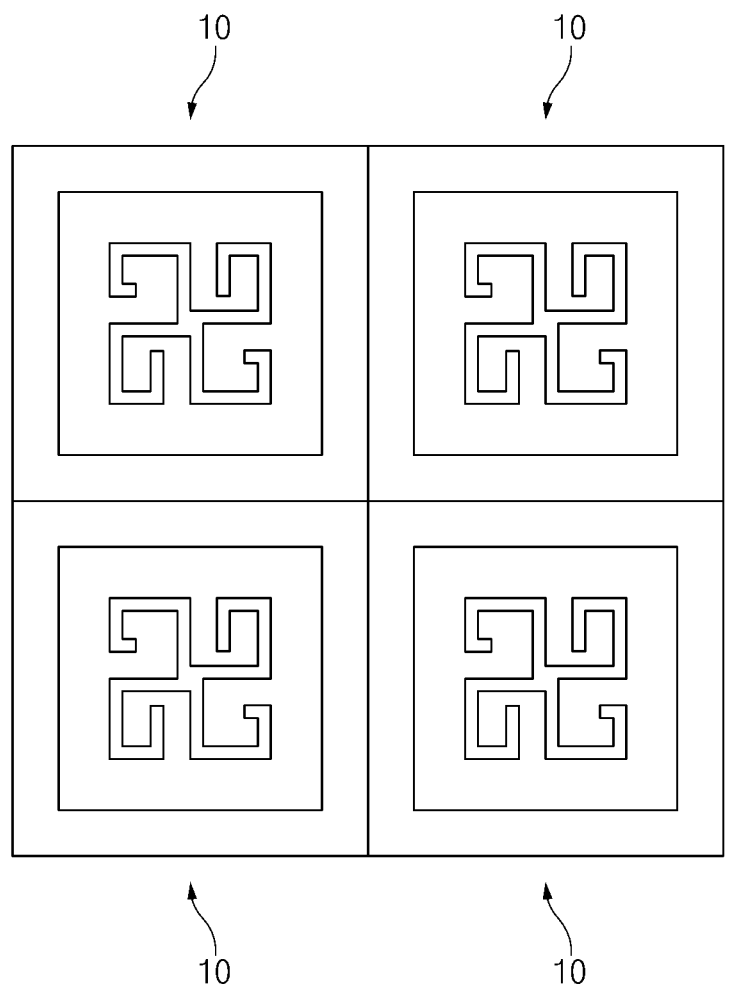
FIG. 14 is an exemplary view illustrating a first example of a state in which a plurality of unit cells are arranged according to various exemplary embodiments of the present disclosure.
Figure 15:
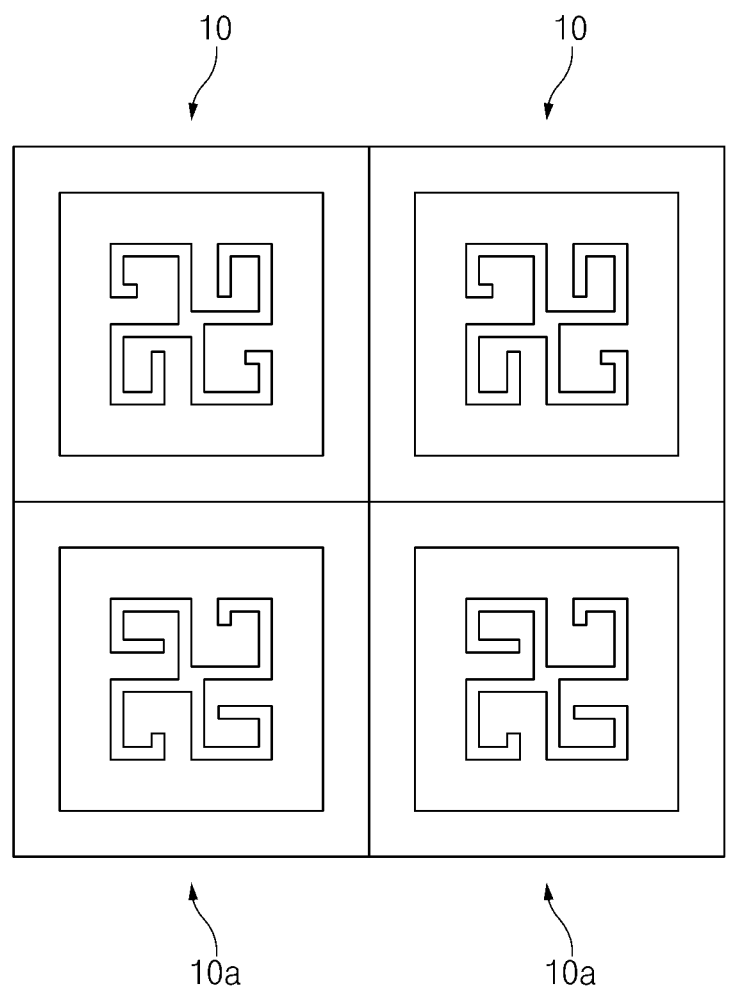
FIG. 15 is an exemplary view illustrating a second example of a state in which a plurality of unit cells and a plurality of deformed unit cells are arranged according to various exemplary embodiments of the present disclosure.

As illustrated in FIGS. 13 to 18, in the electromagnetic wave absorber according to various exemplary embodiments, one or more unit cells 10 may be arranged and connected to various structures. Additionally, as illustrated in FIG. 13, the unit cell 10 may be deformed to have various structures. As illustrated in FIG. 13, the unit cell 10 may rotate at about 90° in a clockwise direction in relation to the center P to form a deformed unit cell 10a. FIG. 14 is an exemplary view illustrating an electromagnetic wave absorber having a plurality of unit cells 10 arranged in predetermined rows and columns FIG. 15 is an exemplary view illustrating an electromagnetic wave absorber having a plurality of unit cells 10 and a plurality of deformed unit cells 10a arranged in a vertical orientation.

Figure 16:
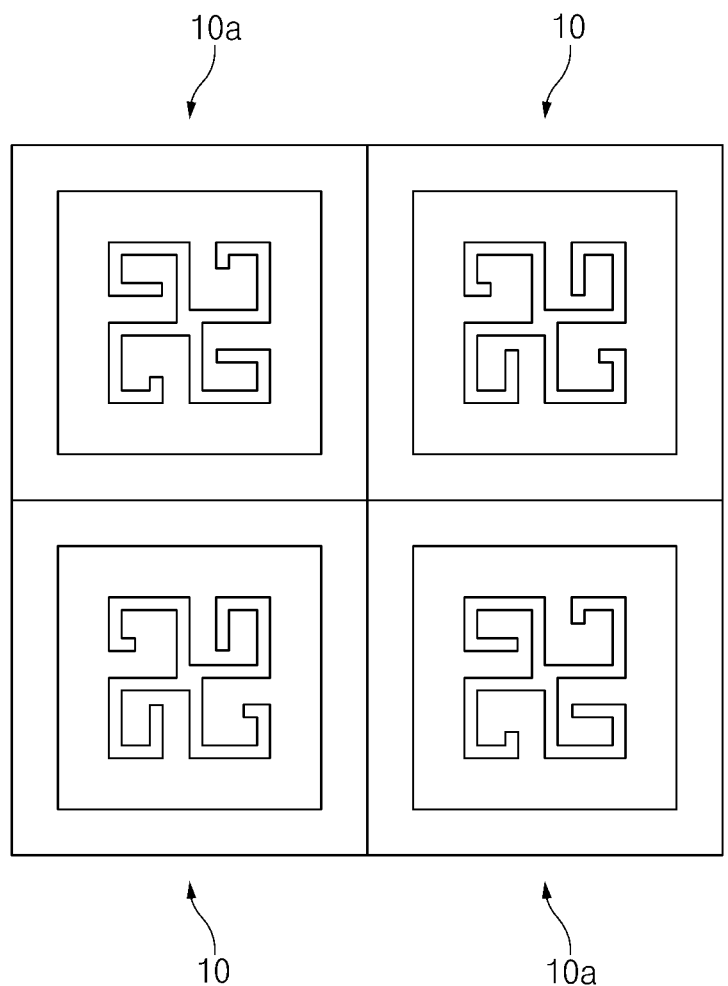
FIG. 16 is an exemplary view illustrating a third example of a state in which a plurality of unit cells and a plurality of deformed unit cells are arranged according to various exemplary embodiments of the present disclosure.
Figure 17:
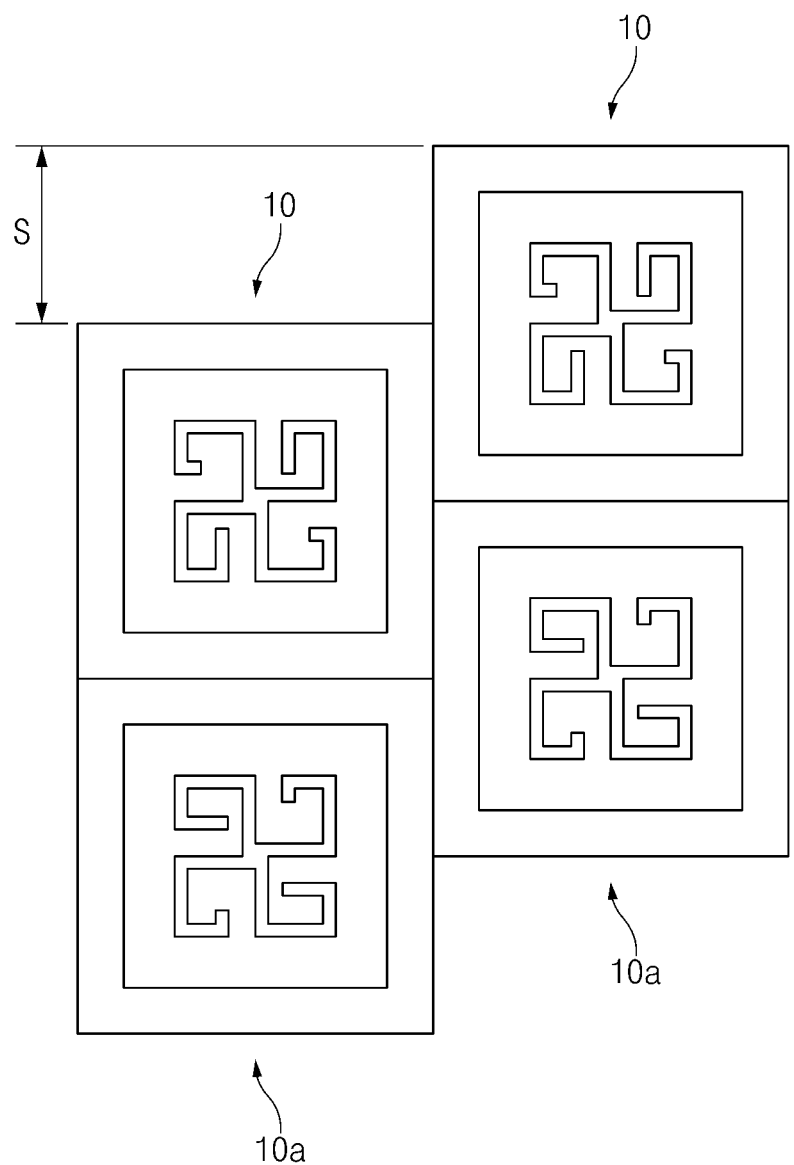
FIG. 17 is an exemplary view illustrating a fourth example of a state in which a plurality of unit cells and a plurality of deformed unit cells are arranged according to various exemplary embodiments of the present disclosure.
Figure 18:
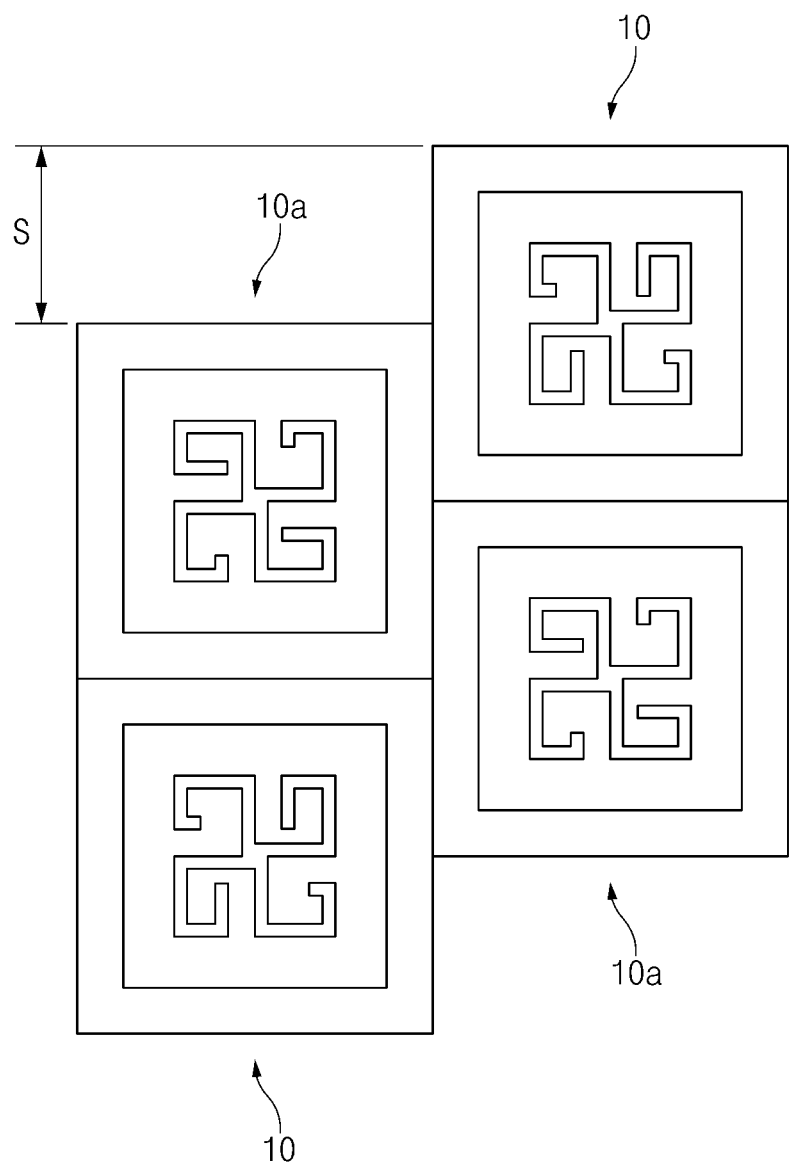
FIG. 18 is an exemplary view illustrating a fifth example of a state in which a plurality of unit cells and a plurality of deformed unit cells are arranged according to various exemplary embodiments of the present disclosure.

FIG. 16 is an exemplary view illustrating an electromagnetic wave absorber in which a plurality of unit cells 10 and a plurality of deformed unit cells 10a are alternately arranged. FIG. 17 is an exemplary view illustrating an electromagnetic wave absorber in which a plurality of unit cells 10 and a plurality of deformed unit cells 10a are arranged in a vertical orientation and predetermined columns are offset at a predetermined interval S. FIG. 18 is an exemplary view illustrating an electromagnetic wave absorber having a plurality of unit cells 10 and a plurality of deformed unit cells 10a alternately arranged and adjacent columns offset at a predetermined interval S. [The figure is determined by length of each slot arm (modified parameter d and e of table 1) and interval S.]

As described above, an electromagnetic wave absorption rate at a target frequency may be significantly increased and insensitivities to polarization and incident angle are increased. Accordingly, when the electromagnetic wave absorber according to the present disclosure is installed around an antenna of a radar sensor (usage frequency: about 24.1 GHz) for a vehicle, it may absorb electromagnetic waves (24.1 GHz) incident in various directions that form a false image and the accuracy of the radar sensor for a vehicle may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An electromagnetic wave absorber, comprising:
a dielectric layer;
a first metal conductive layer disposed on a first surface of the dielectric layer and having a plurality of slots symmetrical about a center of the dielectric layer; and
a second metal conductive layer disposed on a second surface of the dielectric layer,
wherein the first metal conductive layer has a pinwheel structure that connects the plurality of slots relative to a center of the first metal conductive layer, and
wherein the plurality of slots are disposed from the center of the first metal conductive layer, and each of the plurality of slots includes a first slot portion that extends from the center of the first metal conductive layer, a second slot portion that crosses the first slot portion at a first predetermined angle, a third slot portion that crosses the second slot portion at a second predetermined angle, and a fourth slot portion that crosses the third slot portion at a third predetermined angle.

2. The electromagnetic wave absorber according to claim 1, wherein each of the plurality of slots has a split ring resonator (SRR) pattern having a centro-symmetry and a loop-on edge geometry.

3. The electromagnetic wave absorber according to claim 1, wherein the first slot portion and the second slot portion are connected to cross each other at about 90°, the second slot portion and the third slot portion are connected to cross each other at about 90°, and the third slot portion and the fourth slot portion are connected to cross each other at about 90°.

4. The electromagnetic wave absorber according to claim 1, wherein the first slot portion, the second slot portion, the third slot portion, and the fourth slot portion have a same width.

5. The electromagnetic wave absorber according to claim 1, wherein the plurality of slots have a centro-symmetrical pinwheel structure in which the plurality of slots are configured to rotate relative to each other in a clockwise or counterclockwise direction.

6. The electromagnetic wave absorber according to claim 1, wherein the plurality of slots are disposed from the center of the first metal conductive layer and each of the plurality of slots is individually disposed on a first quadrant surface, a second quadrant surface, a third quadrant surface, and a fourth quadrant surface from the center of the first metal conductive layer.

7. The electromagnetic wave absorber according to claim 1, wherein a surface area of the second metal conductive layer is equal to a surface area of the dielectric layer.

* * * * *